US009020979B2

(12) United States Patent
Charlet et al.

(10) Patent No.: US 9,020,979 B2
(45) Date of Patent: Apr. 28, 2015

(54) RICH DATABASE METADATA MODEL THAT CAPTURES APPLICATION RELATIONSHIPS, MAPPINGS, CONSTRAINTS, AND COMPLEX DATA STRUCTURES

(75) Inventors: Kyle J. Charlet, Morgan Hill, CA (US); Nathan D. Church, San Jose, CA (US); Kevin D. Hite, San Jose, CA (US); Christopher M. Holtz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 398 days.

(21) Appl. No.: 13/344,231

(22) Filed: Jan. 5, 2012

(65) Prior Publication Data

US 2013/0179474 A1    Jul. 11, 2013

(51) Int. Cl.
*G06F 17/30*    (2006.01)
*G06F 7/00*    (2006.01)

(52) U.S. Cl.
CPC ............ *G06F 7/00* (2013.01); *G06F 17/30286* (2013.01)

(58) Field of Classification Search
USPC ....................... 707/790–811, 964–975, 999.1; 709/224; 711/171
See application file for complete search history.

(56) References Cited

U.S. PATENT DOCUMENTS

| 6,493,720 | B1 | 12/2002 | Chu et al. |
| 7,519,952 | B2* | 4/2009 | Bordawekar et al. ......... 717/124 |
| 7,849,106 | B1 | 12/2010 | Agrawal et al. |
| 2005/0044113 | A1* | 2/2005 | Manikutty et al. ......... 707/104.1 |
| 2005/0125430 | A1* | 6/2005 | Souder et al. ................. 707/100 |

* cited by examiner

*Primary Examiner* — Tony Mahmoudi
*Assistant Examiner* — Tuan-Khanh Phan
(74) *Attorney, Agent, or Firm* — North Shore Patents, P.C.; Michele Liu Baillie; Lesley Leonessa

(57) ABSTRACT

The capturing of rich database metadata includes: capturing partitioned column metadata of a database as mappings defined by a plurality of constraint statements; defining non-standard user-defined types of the database according to a schema; defining physical representations of columns of the database according to the schema; and storing the defined mappings, the defined user-defined types, and the defined physical representations of columns to a catalog of the database. Application enumerated data values in the database may also be defined according to the XML schema and stored to the catalog of the database. In this manner, the database management system may manage application constraints, user-defined types, and physical representations of data for applications referencing the same database using the metadata information stored in the catalog of the database.

12 Claims, 2 Drawing Sheets

RICH DATABASE METADATA MODEL THAT CAPTURES APPLICATION RELATIONSHIPS, MAPPINGS, CONSTRAINTS, AND COMPLEX DATA STRUCTURES

BACKGROUND

Database catalogs typically capture technical metadata that the database management system (DBMS) enforces. Such metadata may include table names, column names, datatypes, and column sizes. However, many applications that reference the same database control its own data and the relationship of this data across sets of applications outside the knowledge of the DBMS. This may create a complex application architecture that is costly and difficult to manage or change. New applications may not be able to examine the catalog contents and understand the relevant database constraints and data formats. Existing applications may not be updated without the risk of breaking the application related constraints that exist between the applications.

SUMMARY

According to one embodiment of the present invention, a method for capturing rich database metadata, comprises: capturing partitioned column metadata of a database as mappings defined by a plurality of constraint statements; defining non-standard user-defined types of the database according to the schema; defining physical representations of columns of the database according to the schema; and storing the defined mappings, the defined user-defined types, and the defined physical representations of columns to a catalog of the database.

In one aspect of the present invention, the capturing of the partitioned column metadata of the database as mappings defined by the plurality of constraint statements comprises: breaking down a partitioned column of the database into a series of case statements, wherein each case statement defines a new mapping depending on a specific value of a data element embedded in the partitioned column or embedded in another column of the database.

In one aspect of the present invention, the method further comprises: defining application enumerated data values in the database according to the XML schema; and storing the defined application enumerated data values to the catalog of the database.

In one aspect of the present invention, the schema comprises an Extensible Markup Language (XML) schema, wherein the method further comprises: retrieving from the catalog an XML instance document that is valid to the catalog's XML schema.

In one aspect of the present invention, the method further comprises: managing application constraints, user-defined types, and physical representations of data for applications referencing the database using the defined mappings, the defined non-standard user-defined types, and the defined physical representations of columns stored in the catalog of the database.

System and computer program products corresponding to the above-summarized methods are also described and claimed herein.

DETAILED DESCRIPTION

Figure 1:
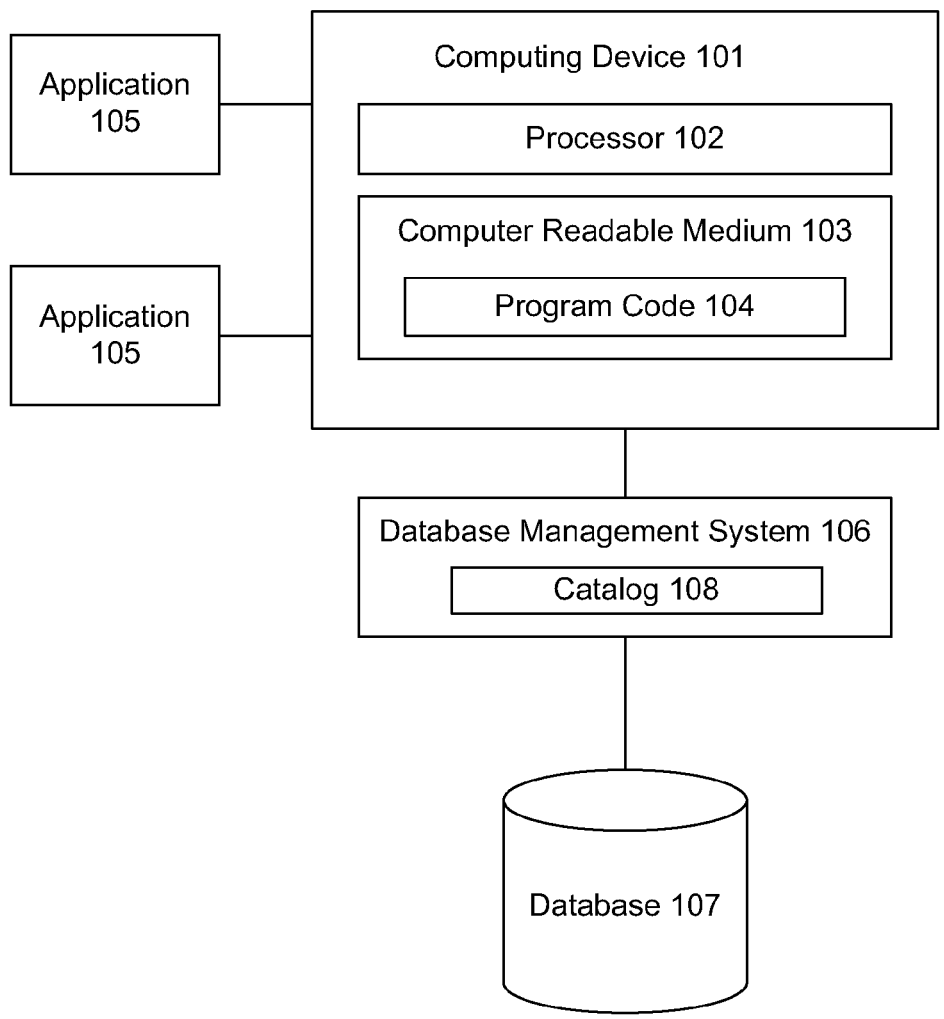
FIG. 1 illustrates an embodiment of a system for capturing rich database metadata according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a system for capturing rich database metadata according to the present invention. The system comprises a computing device 101, such as a server or a plurality of servers, operationally coupled to a processor 102 and a computer readable medium 103. The computer readable medium 103 stores computer readable program code 104 for implementing the method of the present invention. The processor 102 executes the program code 104 to provide the rich database metadata catalog according to the various embodiments of the present invention. The computing device 101 is operationally coupled to a plurality of applications 105 referencing a database 107 managed by a database management system (DBMS) 106. A database catalog 108 is maintained by the DBMS 106 for storing metadata relevant to the database 107.

The embodiments of the present invention captures certain metadata information for data stored by the plurality of applications 105 referencing the same database 107, in order to build a more comprehensive model of the database 107. The database catalog 108 of the database 107 is enhanced to store this metadata information. In one embodiment, the metadata is modeled as an Extensible Markup Language (XML) schema but may be based on other formats. XML instance documents valid to the catalog's XML schema can be retrieved from the catalog. Tools may then consume the XML instance document to discover the metadata information describing the target database.

Figure 2:
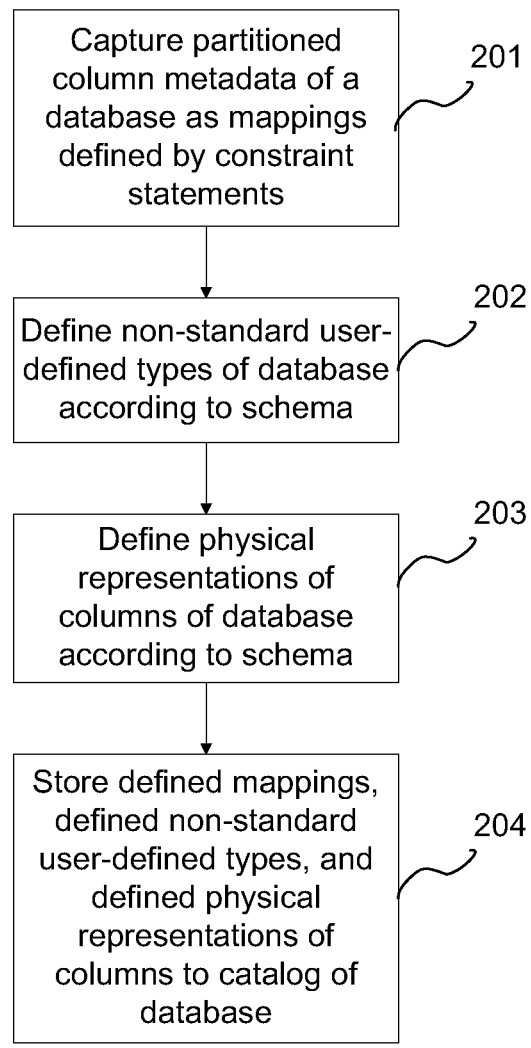
FIG. 2 is a flowchart illustrating an embodiment of a method for capturing rich database metadata according to the present invention.

FIG. 2 is a flowchart illustrating an embodiment of a method for capturing rich database metadata according to the present invention. In this embodiment, the method captures the application constraints, user-defined types, and the physical representation of the data in a metadata format that integrates with the existing database metadata. This combined metadata is modeled according to an XML schema. More specifically, the method captures the partitioned column metadata of a database as mappings defined by constraint statements (201), defines non-standard user-defined types (UDT) of the database 107 according to the XML schema (202), defines the physical representations of the columns of the database 107 according to the XML schema (203), and stores the defined mappings, the defined non-standard UDTs, and the defined physical representations of the columns to the catalog 108 of the database 108 (204).

A single column in the database 107 may be partitioned in multiple ways. This partitioning is managed by the applications 105 working with the column. Typically, the DBMS 106 has no control over the partitioning as the metadata defining the partitioning is embedded in the applications 105 and not defined to the database catalog. The applications 105 embed the knowledge to determine which column type the data actually represents during runtime processing. However, per 201 of the method, the partitioned column metadata is broken down into a series of 'case' statements, where each 'case' fully defines a new mapping depending on a specific value of a data element embedded in the column or in another column in the table. Storing this mapping in the catalog 108 (per 204) allows the DBMS 106 to manage the constraints and remove the burden on the applications 105. At runtime, the applications 105 may retrieve the constraints information from the catalog 108 and be informed of the mappings for the partitioned columns. Neither the logic to manage these constraints nor the knowledge of constraint relationships across applications need be embedded in the applications 105 themselves.

Non-standard UDTs are also stored in the database 107 and managed by the applications 105. An example includes a bit string where bit(s) equates to something meaningful within an application. With the present invention, the non-standard UDTs are defined according to the XML schema (per 202) and stored in the catalog 108 in a non-XML format (per 204). The DBMS 106 may manage these non-standard UDTs and remove that burden on the applications 105. For example, applications 105 may obtain from the catalog 108 the name of the class or module to which to call for the marshaling and unmarshaling of data. Since this metadata is stored in the catalog 108, the metadata need not be stored in the applications 105 themselves.

The applications 105 control not only the logical representation of data, but also the physical representation of the data on disk. For example, a logical DATE field may be stored in a packed decimal format of the application's choosing. With the present invention, both the logical and physical representation of the columns are defined according to the XML schema (per 203) and stored in the catalog 108 in a non-XML format (per 204). This allows the DBMS 106 to manage the physical layouts of the data, removing the burden from the applications 105. The applications 105 may concern themselves with the logical data types without being required to manage the physical data types.

The applications 105 typically control the enumeration of data values that may be stored for any particular column of the database 107. Thus in another embodiment of the present invention, the method further defines application enumerated data values in the database 107 according to the schema and stores the defined application enumerated data values to the catalog 108 of the database 107. The DBMS 106 may then take over constraint validation for the enumerated data values, removing this burden on the applications 105. Neither the logic to manage these constraint validations nor the knowledge of the enumerated data values need be embedded in the applications 105 themselves.

In this manner, the DBMS 106, or the data access layer, can manage application constraints, user defined types, physical representation of the data, and/or complex data structures on behalf of the applications 105 referencing the same database 107. This reduces the logic needed in the applications 105 and across a suite of applications. The applications 105 are not required to ensure the integrity of the data.

Further to the above, application scanners existing in databases may be modified to add the scanner's derived constraints and cross-application constraints to the catalog 108 of the present invention, further enhancing the catalog 108.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for capturing rich database metadata associated with a database, comprising:

enhancing a database catalog with the database metadata, wherein a database management system manages the database catalog, wherein the database catalog allows the database management system to manage application constraints, user defined types, complete data structures and physical representation of data on behalf of applications associated with the database, relieving the applications of a requirement to ensure integrity associated with the data, by:

capturing partitioned column metadata of a database, for columns referenced by one or more applications referencing the database, as mappings defined by a plurality of constraint statements, wherein the database management system, via the database catalog, manages constraints associated with the columns instead of the one or more applications;

defining non-standard user-defined types of the database referenced by the one or more applications referencing the database according to a schema, wherein the database management system, via the database catalog, manages the non-standard user-defined types of the database instead of the one or more applications;

defining physical representations of the columns of the database according to the schema, wherein the physical representations of the columns are referenced by the one or more applications referencing the database, wherein the database management system, via the database catalog, manages the physical representations of the columns of the database instead of the one or more applications;

storing the defined mappings, the defined user-defined types, and the defined physical representations of columns to the database catalog of the database;

managing application constraints, the non-standard user-defined types, and the physical representation of the columns by a database management system for the database on behalf of the one or more applications referencing the database using the defined mappings, the defined user-defined types, and the defined physical representations of the columns stored to the database catalog, wherein logic for managing the application constraints, the non-standard user-defined types, and the physical representation of the columns are not stored in the one or more applications; and wherein the enhanced database catalog comprises application constraints, user-defined types, and physical representation of the data in a metadata format that integrates with an existing database metadata model.

2. The method of claim 1, wherein the capturing of the partitioned column metadata of the database as mappings defined by the plurality of constraint statements comprises:

breaking down a partitioned column of the database into a series of case statements, wherein each case statement defines a new mapping depending on a specific value of a data element embedded in the partitioned column or embedded in another column of the database.

3. The method of claim 1, further comprising:
defining application enumerated data values in the database controlled by the one or more applications referencing the database according to the XML schema; and
storing the defined application enumerated data values to the database catalog of the database.

4. The method of claim 1, wherein the schema comprises an Extensible Markup Language (XML) schema, wherein the method further comprises:
retrieving from the database catalog an XML instance document that is valid to the database catalog's XML schema.

5. A computer program product for capturing rich database metadata associated with a database, the computer program product comprising:
a computer readable storage device having computer readable program code embodied therewith, the computer readable program code configured to:
enhance a database catalog with the database metadata, wherein a database management system manages the database catalog, wherein the database catalog allows the database management system to manage application constraints, user defined types, complete data structures and physical representation of data on behalf of applications associated with the database, relieving the applications of a requirement to ensure integrity associated with the data, by:
capturing partitioned column metadata of a database, for columns referenced by one or more applications referencing the database, as mappings defined by a plurality of constraint statements, wherein the database management system, via the database catalog, manages constraints associated with the columns instead of the one or more applications;
defining non-standard user-defined types of the database referenced by the one or more applications referencing the database according to a schema, wherein the database management system, via the database catalog, manages the non-standard user-defined types of the database instead of the one or more applications;
defining physical representations of the columns of the database according to the schema, wherein the physical representations of the columns are referenced by the one or more applications referencing the database, wherein the database management system, via the database catalog, manages the physical representations of the columns of the database instead of the one or more applications;
storing the defined mappings, the defined user-defined types, and the defined physical representations of columns to the database catalog of the database;
managing application constraints, the non-standard user-defined types, and the physical representation of the columns by a database management system for the database on behalf of the one or more applications referencing the database using the defined mappings, the defined user-defined types, and the defined physical representations of the columns stored to the database catalog,
wherein the computer readable program code configured to manage the application constraints, the non-standard user-defined types, and the physical representation of the columns are not stored in the one or more applications; and
wherein the enhanced database catalog comprises application constraints, user-defined types, and physical representation of the data in a metadata format that integrates with an existing database metadata model.

6. The computer program product of claim 5, wherein the computer readable program code configured to capture the partitioned column metadata of the database as mappings defined by the plurality of constraint statements is further configured to:
break down a partitioned column of the database into a series of case statements, wherein each case statement defines a new mapping depending on a specific value of a data element embedded in the partitioned column or embedded in another column of the database.

7. The computer program product of claim 5, wherein the computer readable program code is further configured to:
define application enumerated data values in the database controlled by the one or more applications referencing the database according to the XML schema; and
store the defined application enumerated data values to the database catalog of the database.

8. The computer program product of claim 5, wherein the schema comprises an Extensible Markup Language (XML) schema, wherein the computer readable program code is further configured to:
retrieve from the database catalog an XML instance document that is valid to the database catalog's XML schema.

9. A system comprising:
a processor; and
a computer readable storage medium having computer readable program code for capturing rich database metadata associated with a database embodied therewith, wherein when executed by the processor, the computer readable program code causes the system to:
enhance a database catalog with the database metadata, wherein a database management system manages the database catalog, wherein the database catalog allows the database management system to manage application constraints, user defined types, complete data structures and physical representation of data on behalf of applications associated with the database, relieving the applications of a requirement to ensure integrity associated with the data, by:
capturing partitioned column metadata of a database, for columns referenced by one or more applications referencing the database, as mappings defined by a plurality of constraint statements, wherein the database management system, via the database catalog, manages constraints associated with the columns instead of the one or more applications;
defining non-standard user-defined types of the database referenced by the one or more applications referencing the database according to a schema, wherein the database management system, via the database catalog, manages the non-standard user-defined types of the database instead of the one or more applications;
defining physical representations of columns of the database according to the schema, wherein the physical representations of the columns are referenced by the one or more applications referencing the database, wherein the database management system, via the database catalog, manages the physical representations of the columns of the database instead of the one or more applications;
storing the defined mappings, the defined user-defined types, and the defined physical representations of columns to the database catalog of the database;

managing application constraints, the non-standard user-defined types, and the physical representation of the columns by a database management system for the database on behalf of the one or more applications referencing the database using the defined mappings, the defined user-defined types, and the defined physical representations of the columns stored to the database catalog, wherein the computer readable program code configured to manage the application constraints, the non-standard user-defined types, and the physical representation of the columns are not stored in the one or more applications; and wherein the enhanced database catalog comprises application constraints, user-defined types, and physical representation of the data in a metadata format that integrates with an existing database metadata model.

10. The system of claim 9, wherein in the capturing of the partitioned column metadata of the database as mappings defined by the plurality of constraint statements, the system further:

breaks down a partitioned column of the database into a series of case statements, wherein each case statement defines a new mapping depending on a specific value of a data element embedded in the partitioned column or embedded in another column of the database.

11. The system of claim 9, wherein the system further:

defines application enumerated data values in the database controlled by the one or more applications referencing the database according to the XML schema; and stores the defined application enumerated data values to the database catalog of the database.

12. The system of claim 9, wherein the schema comprises an Extensible Markup Language (XML) schema, wherein the system further:

retrieves from the database catalog an XML instance document that is valid to the database catalog's XML schema.

* * * * *